United States Patent [19]

Yamamoto

[11] Patent Number: 4,737,949
[45] Date of Patent: Apr. 12, 1988

[54] TRANSMISSION SYSTEM FOR DIGITAL REPEATER SUPERVISORY CODE TRANSMISSION

[75] Inventor: Shu Yamamoto, Tokyo, Japan

[73] Assignee: Kokusai Denshin Denwa Co., Ltd., Tokyo, Japan

[21] Appl. No.: 916,587

[22] Filed: Oct. 8, 1986

[30] Foreign Application Priority Data

Oct. 22, 1985 [JP] Japan .................. 60-234526

[51] Int. Cl.[4] .................. H04J 1/16; H04J 3/14
[52] U.S. Cl. .................. 370/13.1; 375/3.1; 371/49
[58] Field of Search .......... 370/13.1, 110.1, 97, 370/13, 17; 375/3, 3.1, 4; 379/4; 371/49, 50

[56] References Cited

U.S. PATENT DOCUMENTS

| | | | |
|---|---|---|---|
| 3,757,051 | 9/1973 | Girard et al. | 370/97 |
| 3,950,622 | 4/1976 | Taylor | 370/13.1 |
| 4,266,183 | 5/1981 | Steensma et al. | 370/13.1 |
| 4,402,075 | 8/1983 | Bargeton et al. | 370/97 |
| 4,653,070 | 3/1987 | Nakajima et al. | 371/49 |

Primary Examiner—Douglas W. Olms
Assistant Examiner—Wellington Chin
Attorney, Agent, or Firm—Jordan and Hamburg

[57] ABSTRACT

In a transmission system, which includes one or more digital repeaters in a transmission line and a digital multiplex/demultiplex branching unit, a code for supervising the digital repeater or repeaters in an in-service state is transmitted according to a data sequence signal obtained through bit-by-bit time-division multiplexing of at least two different kinds of digital signals. The supervisory code has a configuration of a transmission line code obtained by dividing the digital signals into blocks of bits corresponding in number to the sum $(n \times m' + 1)$ of the product of the number n of channels of the digital signals and positive odd number m' and one and adding after each of the blocks a number of parity bits (supervisory bits) corresponding to the respective digital signals equal to the number of the channels, i.e., has a bit configuration of $n(m'+1)+1$.

1 Claim, 4 Drawing Sheets

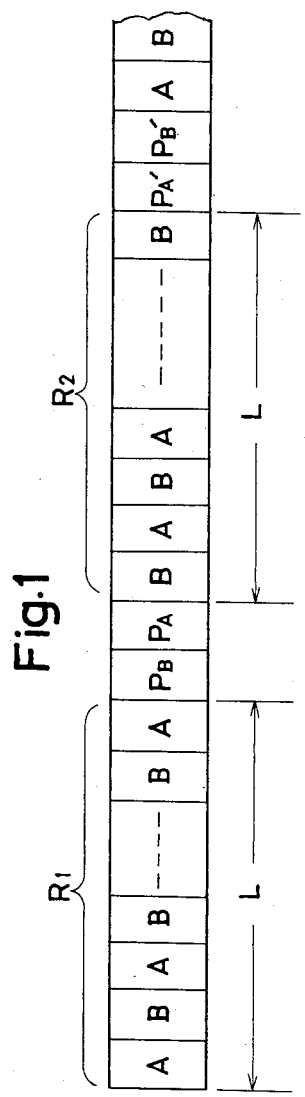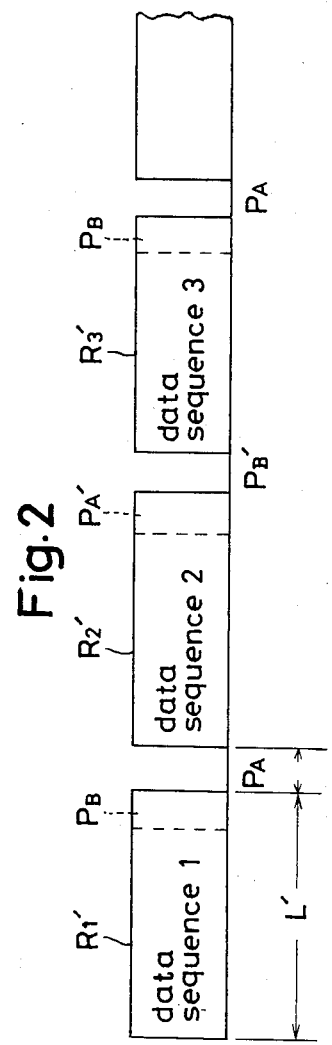

TRANSMISSION SYSTEM FOR DIGITAL REPEATER SUPERVISORY CODE TRANSMISSION

FIELD OF THE INVENTION

The present invention relates to an improvement of a transmission system for digital repeater supervisory code transmission under in-service state in a digital repeater transmission line.

DESCRIPTION OF THE PRIOR ART

In a digital signal transmission line including repeaters, it is important to supervise each repeater in order to monitor the operating state of the regenerator and also localize the faulty regenerator at the time of occurrence of the trouble. The repeater supervisory systems include an out-of-service system, in which the repeater is monitored by interrupting the service and sending out a special signal, and an in-service system, in which the repeater is monitored by inserting a special signal in the trasmission signal while continuing the service. FIG. 5 shows a trasmission line code for digital repeater supervisory used in the prior art in-service system. This code is called mBIP code. This mBIP consists of data sequences R1 to Rn constituted by respective m-bit blocks and one-bit even parity bits Pl and Pn (supervisory bits). If there are an even number of "1" marks in the blocks of data sequences R1 to Rn (m being usually an even number to prevent the continuity of mark signal), the parity bits Pl to Pm are controlled to "0". On the other hand, if there are an odd number of "1" marks in the data sequences R1 to Rn, the parity bits Pl to Pn are controlled to "1". In this way, the number of marks in each of the (m+1)-bit blocks individually including data sequences R1 to Rn and parity bits Pl to Pn is made to be an even number at all time.

When the mBIP code is fed to a T flip-flop (divider circuit), the output of the T flip-flop at the position corresponding to each of the parity bits Pl to Pn is constant at all time. FIG. 6(a) shows output signal of the T flip-flop. If the first parity bit Pl is "1", the subsequent output of the parity bits P2 to Pn is "1" at all time. However, when an odd number of errors e are generated in a certain data series, the number of marks becomes an odd number, so that the parity state is violated, and the T flip-flop output of the parity bit Pi is inverted to "0". If subsequently no error occurs in the data series Pi to Pn, the value "0" is held as such. It is to be noted that when the even parity rule is violated due to generation of an error bit e, the output of the T flip-flop is inverted.

FIG. 6(b) shows the DC component of the signal shown in FIG. 6(a), obtained through a low-pass filter (L.P.F.). As is seen from the Figure, there occurs a change in the DC shift at a point corresponding to the error bit e. Thus, it is possible to detect a bit error e' on the transmission line with the DC shift change sent into the terminal station through a signal multiplex/demultiplex branching unit.

In a digital transmission line where a large number of repeaters are contained, it is necessary to identify a given repeater. Heretofore, a repeater is identified as follows.

The parity bit of the mBIP code in the even parity rule is violated to the odd parity at a certain frequency. In this case, a frequency signal corresponding to one half period of the frequency noted above can be obtained as the output of the T flip-flop and L.P.F. A repeater selection signal and a supervisory command signal are transmitted using e.g., ASK modulation with the frequency as carrier. In the repeater, a band-pass filter (B.P.F.) detects the ASK signal with the frequency noted above as carrier, and a supervisory command signal detector detects each signal. Therefore, each regenerator circuit is identified by code designation based on the ASK signal.

Meanwhile, there is a star-connection network system, which is designed to reduce the transmission line length from the standpoint of economy. In order to enable this system, the branching system is necessary and as the branching system there is a time-division multiplexing system. As the time-division multiplexing system, there are a word unit multiplexing system and a bit unit multiplexing system. The later system, i.e., bit unit multiplexing system, is usually used in that a signal replacement operation is simple and that timing recovery is ready obtained.

FIG. 7(a) shows a communication network, which communication among a plurality of signal transmitter/receiver units 1 (hereinafter referred to nodes A, B and C) is effected on the basis of the bit unit multiplexing system. (To simplify the description, the number of nodes is set to 3).

In the Figure, reference numeral 2 designates a signal multiplex/demultiplex branching unit, which re-forms data sequences transmitted from the individual nodes A, B and C to produce data sequences directed to the nodes A, B and C. Reference numeral 3 designates transmitting lines for signal transmission including a plurality of repeaters, and numeral 3' transmission lines for signal receiving line including a plurality of repeater. FIG. 7(b) shows transmission data sequenses RA to RC and reception data sequenses RA' to RC' of the nodes A, B and C. As for the data sequences transmitted from the nodes A and B to the node C, the data sequences RA and RB transmitted from the nodes A and B are re-formed by the signal multiplex/demultiplex branching unit 2 into a data sequences RC' directed to the node C. A case will now be considered, in which the mBIP code noted above is used in data sequences RA' to RC', which are obtained by re-forming the transmitted data sequences RA to RC on the basis of the bit unit multiplexing system. In the transmitted data sequence RA from the node A, for instance, one parity bit is inserted for every m bits. Since m is an even number, the position of the first parity bit (P1) corresponds an odd number. Thus, the first parity bit (P1) is time-division multiplexed to the received data sequence RC' directed to the node C. The second parity bit (P2) corresponds to a position (m+1+m+1), i.e., an even number, so that it is time-division multiplexed to the received data sequence RB' directed to the node B. Thus, the parity bits in the even parity rule provided in the transmitted data sequence RA from the node A are:

(1) provided to different received data sequences RB' and RC'; and (2) alternately time-division multiplexed to the different nodes B and C.

As is obvious from the above, the parity bit status is disturbed. In other words, the prior art mBIP code can not be applied to the bit unit multiplexing system based on the time-division. Further, the prior art mBIP code can not be applied to a system, where the transmission rate is converted through separation of data sequences.

SUMMARY OF THE INVENTION

The invention has been intended in the light of the drawbacks in the prior art as discussed above, and it seeks to provide a digital repeater supervisory code trasmission system, which is capable of in-service monitoring of repeaters even when bit unit time-division multiplexing or transmission rate conversion is done by the signal multiplex/demultiplex branching unit.

According to the invention, in a transmission system, which includes one or more digital repeaters in a transmission line, and in which a code for supervisoring the digital repeater or repeaters in an in-service state is transmitted according to a data sequence signal obtained through bit-by-bit time-division multiplexing of at least two different kinds of digital signals, the supervisory code has a configuration of a transmission line code obtained by dividing the digital signals into blocks of bits corresponding in number to the sum $(n \times m' + 1)$ of the product of the number n of channels of the digital signals and positive odd number m' and one and adding after each of the blocks a number of parity bits (supervisory bits) corresponding to the respective digital signals equal to the number of the channels, i.e., has a bit configuration of $n(m'+1)+1$.

BRIEF DESCRIPTION OF THE DRAWINGS

FIG. 1 is a view showing a configuration of a transmission line code in case where there are two different kinds of data in a first embodiment of the invention;

FIG. 2 is a view showing an output signal obtained as a result of feeding the transmission line code through a divider;

DESCRIPTION OF THE PREFERRED EMBODIMENT

Now, a first embodiment of the invention will be described with reference to FIGS. 1 to 4.

FIG. 1 shows a transmission line code in case where there are two different kinds of data. The Figure shows a data sequence obtained as a result of bit unit time-division multiplexing of data to be transmitted to a multiplex/demultiplex branching unit. Each of the data sequences R1 to Rn has a block length L consisting of $2 \times m' + 1$ (m being an even number) bits. Subsequent to the block are added a parity bit PB of data (B) different from the data of the last data channel (i.e., A in the case of FIG. 1) and then a parity bit PA of data A.

In the next data sequence R2, the first B, for the last data of the preceding data sequence R1 is data A, and also the last data in the block length L is data B. Thus, the parity bits are added in the order of PA' and PB'.

It is to be understood that the system according to the invention adopts a digital repeater supervisory transmission line code (hereinafter referred to as transmission line code) which consists of data sequences R1 to Rn corresponding to the block length L constituted by $n \cdot m + 1$ bits and subsequently added parity bits P corresponding in number to the number n data channel bits.

Now, the way of detection of code error in case where the transmission line code according to the invention is used will be described.

Figure 6A:
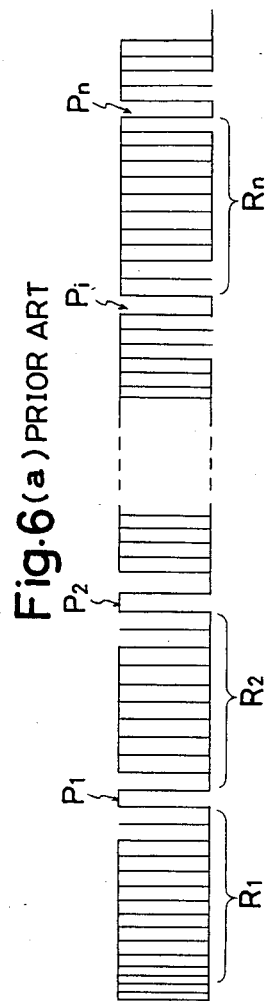
FIGS 6(a) and 6(b) are views showing an output signal and a DC component shift thereof obtained in case where the prior art mBIP signal is fed to a divider.
Figure 6B:
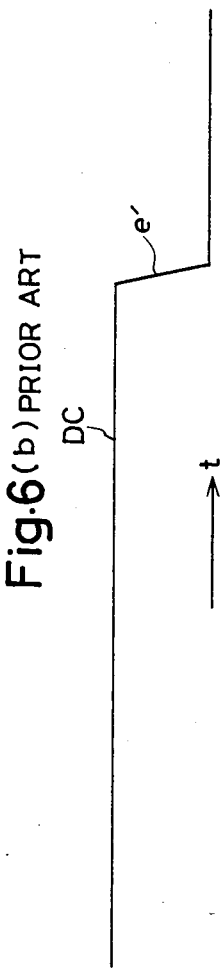

FIG. 2 shows an output signal in case when the transmission line code is fed to a T flip-flop (divider). In this case, it is possible to take out a waveform like the prior art T flip-flop output signal (shown in FIG. 6). More specifically, the parity bit PB provided subsequant to the data sequence R1 can be regarded to be in the data sequence R1. This means that the equivalent block length L' is $$L' = L + 1 = (2m' + 1) + 1 = 2(m' + 1) \tag{1}$$

Thus, it consists of an even number of bits at all time. Therefore, adding one parity bit PA to the block length L' consisting of an even number of bits can be regarded to be the same in configuration as the prior art mBIP code. This means that the output of the T flip-flop can be treated in the same way as the mBIP code. As noted above, the parity bit (PB or PA') which is provided immediately after the data sequences R1' or R2' is regarded to be part of the data sequences R1' to R2'. Doing so gives rise to no problem. This will be theoretically verified as follows.

Where the mark density of the data sequence A or B (i.e., the probability that the data is "1") is ½ and the parity bits PA, PB, PA' and PB' are based on the even parity rule, the balance of the parity bits PB and PA' which are regarded as part of the data sequences 1l' to Rn', i.e., the probability P of being mark "1" (or space "0"), is the probability that data sequences B in the data sequence R1' or m' data bits A in the data sequence R2' that are "1" (or "0") are odd (or even) in number.

Thus, the probability P of the parity bits PB and PA' is $$P(PB = 0) = P(PA' = 0) \tag{2}$$

$$= \sum_{k=0}^{\frac{m'-1}{2}} (\tfrac{1}{2})^{2k} \cdot (\tfrac{1}{2})^{m'-2k} \cdot \binom{m'}{2k}$$

$$= \sum_{k=0}^{\frac{m'-1}{2}} \binom{m'}{2k} \cdot (\tfrac{1}{2})^{m'}$$

$$= 2^{m'-1} \cdot (\tfrac{1}{2})^{m'}$$

$$= \tfrac{1}{2}$$

$$P(PB = 1) = P(PA' = 1) \tag{3}$$

$$= \sum_{k=1}^{\frac{m'+1}{2}} (\tfrac{1}{2})^{2k-1} \cdot (\tfrac{1}{2})^{m'-(2k-1)} \cdot \binom{m'}{2k-1}$$

$$= \sum_{k=1}^{\frac{m'+1}{2}} (\tfrac{1}{2})^{m'} \cdot \binom{m'}{2k-1}$$

-continued $$= (\tfrac{1}{2})^{m'} \sum_{k=0}^{\frac{m'-1}{2}} \binom{m'}{2k-1}$$

$$= (\tfrac{1}{2})^{m'} \cdot 2^{m'-1}$$

$$= \tfrac{1}{2}$$

As is obvious from the equations (2) and (3), with the parity bits PB and PA' the mark density (i.e., space density) of the data bits is the same, i.e., $\tfrac{1}{2}$. Thus, there is no problem if the parity bits PB and PA' are regarded as part of the data sequences R1' to R2'.

The identification of the repeater may be obtained in the same way as in the prior art using a frequency, which is obtained by changing the parity bit PB or PA' provided after the data sequences R1' to Rn' from the even parity rule to the odd parity rule at a certain frequency like the prior art mBIP code.

Figure 3:
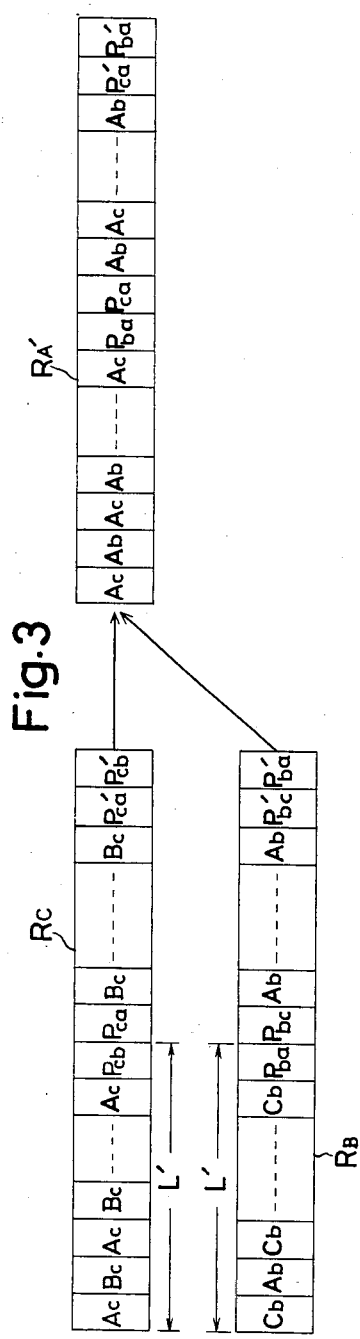
FIG. 3 is a view showing a configuration of a transmission line code in case where the invention is applied to a time-division multiplexing branching communication system.
Figure 7A:
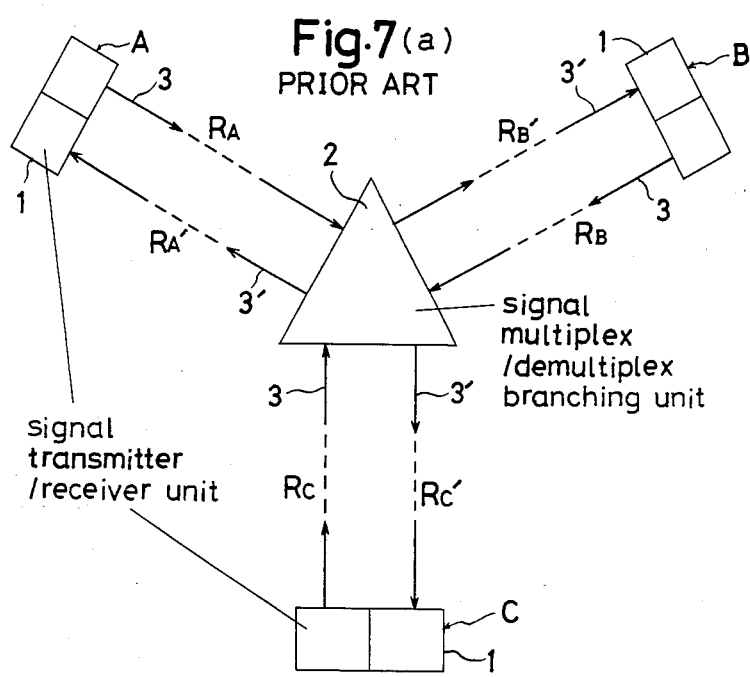
FIG. 7(a) is a view showing a time-division multiplexing communication system network including a signal multiplex/demultiplex unit.
Figure 7B:
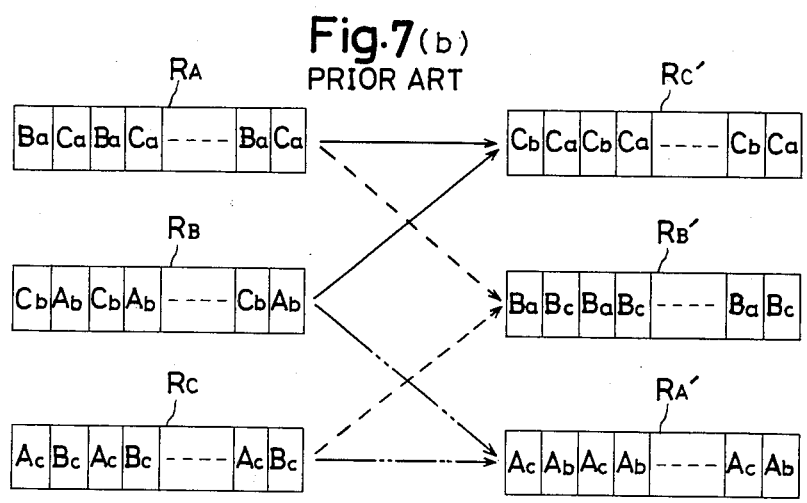
FIG. 7(b) is a view for explaining a flow of a data sequences handled in the system network shown in FIG. 7(a).

FIG. 3 shows a specific example of data sequences obtained as a result of re-forming in the signal multiplex/demultiplex branching unit 2 in the communication system shown in FIG. 7(a) for the individual nodes. More specifically, the illustrated example is a recieved data sequence RA' obtained as a result of re-forming from the node A of transmitted data sequences RB and RC from the nodes C and B. The data sequences Ac (which are in an even number of $m'+1$ per block length) and parity bits Pca, transmitted from the node C to the node A, are found in the same status in the received data sequence RA directed to the node A even after the re-forming in the signal multiplex/demultiplex branching unit 2. Likewise, the data sequences Ab (in an odd number of m' per block length) and parity bits Pba, transmitted from the node B to the node A, are found in the same status in the received data sequence RA' directed to the node A.

The description so far has concerned with the case, in which the transmission line code is time-division multiplexed at the same rate in the signal multiplex/demultiplex branching unit 2. However, the invention is also applicable to the case where rate conversion is effected in the signal multiplex/demultiplex branching unit 2.

Figure 4:
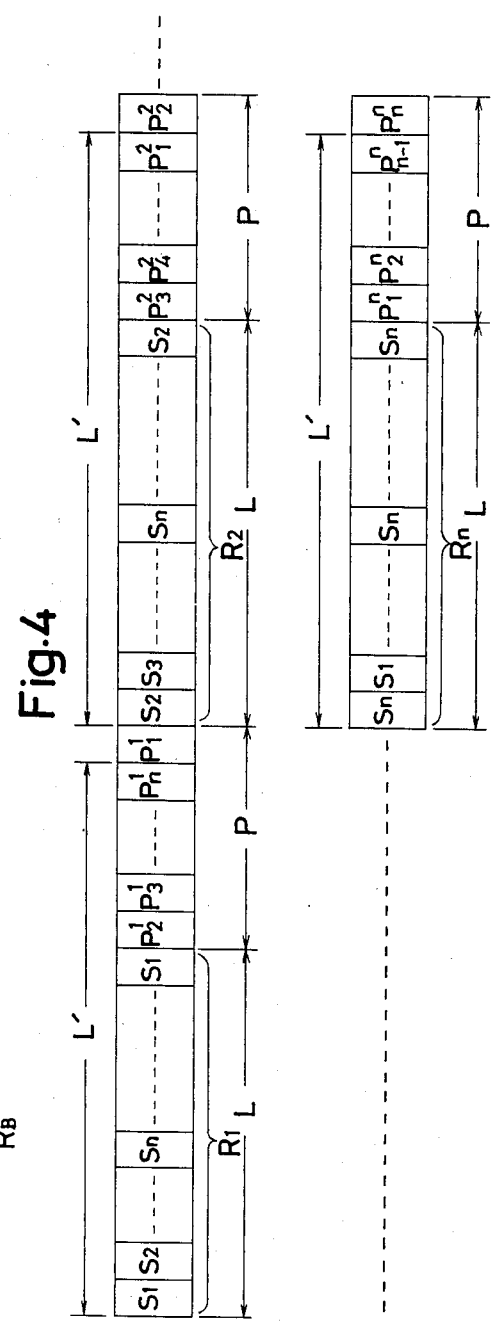
FIG. 4 is a view showing a configuration of a transmission line code in case where there are n different kinds of data in a second embodiment of the invention.
Figure 5:
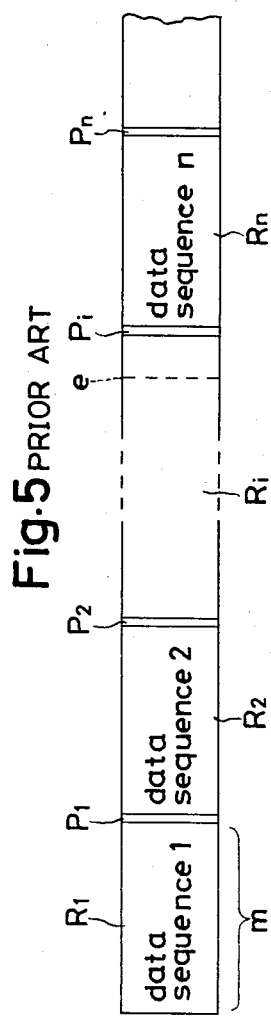
FIG. 5 is a view showing a configuration of a prior art mBIP code.

Now, an second embodiment of the present invention will be explained referring FIG. 4. FIG. 4 is a view showing the configuration of the transmission line code concerning n-channel data.

Each of the data sequences R1 to Rn has a block length L of $L = n \cdot m' + 1$ and subsequent n parity bits P. The parity bit Pl represents a parity bit of data bit S1. The right top side prefix of each parity bit represents the order number of the data sequences.

The configuration of the data sequence R1 will now be described as a typical example. The data sequence R1 is obtained through multiplexing, in which a cycle starting with data bit S1 and ending with data bit Sn is repeated m' (m' being an odd number) times, and it ends with further data bit S1.

The order of parity bits is from the parity bit $P_2^1$, the first parity bit of the last data bit S1, through $P_n^1$ to $P_1^1$ as the last parity bit. Thus, the equivalent block length L' of data is $$L' = n \cdot m' + 1 + (n - 1) \quad (4)$$

$$= n \cdot m' + n$$

$$= n(m' + 1)$$

The number in parentheses, i.e., $(m'+1)$, is an even number at all time, so that the equivalent block length L' of data corresponds to an even number. Thus, the same transmission line code configuration as the mBIP code can be obtained. The balance in the case of $n-1$ parity bits is expressed in the same manner as the equations (2) and (3) for the case of $n=2$, and the mark density is $\tfrac{1}{2}$.

As has been described in the foregoing, in the system according to the invention data sequences obtained through bit-by-bit time-division multiplexing of n different kinds of signals is divided into blocks bits corresponding in number to $(n \cdot m' + 1)$ (m' being an odd number) and adding after each block n parity bits, thus making the equivalent block length L' of data sequences to be $n(m'+1)$. The invention thus is applicable to a digital repeater supervisory transmission line code of a communication network in which signals are multiplexed and demultiplexed through time-division multiplexing, so that it is very useful in industries.

What is claimed is:

1. A transmission system for a digital repeater supervisory code transmission system including at least one digital repeater and a digital multiplex/demultiplex branching unit, in which supervisory bits for said digital repeater supervisory code are transmitted through a transmission line in order to supervise said at least one digital repeater in an in-service state and said supervisory bits to be inserted in data sequences obtained through bit-by-bit time-division multiplexing of at least two different digital channels, so that a consequent transmission line code obtains a configuration of said data sequences which comprises said data sequences divided into blocks of bits in a number corresponding to the sum of the product of the number of said channels and a certain positive odd number and one, and supervisory parity bits for each of said data sequences of said at least two different digital channels, wherein said supervisory parity bits associated with each of said blocks, is adjoined after each of said blocks to form each said data sequence.

* * * * *